(12) United States Patent
Guo et al.

(10) Patent No.: US 11,263,024 B2
(45) Date of Patent: Mar. 1, 2022

(54) COMPUTERS WITH BIOS OPTIMIZATION

(71) Applicant: HEWLETT-PACKARD DEVELOPMENT COMPANY, L.P., Houston, TX (US)

(72) Inventors: Fu-Jyu Guo, Taipei (TW); Ming Chang Hung, Taipei (TW); Hung Lung Chen, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 639 days.

(21) Appl. No.: 16/076,910

(22) PCT Filed: Apr. 19, 2017

(86) PCT No.: PCT/US2017/028304
§ 371 (c)(1),
(2) Date: Aug. 9, 2018

(87) PCT Pub. No.: WO2018/194576
PCT Pub. Date: Oct. 25, 2018

(65) Prior Publication Data
US 2021/0182080 A1 Jun. 17, 2021

(51) Int. Cl.
G06F 9/44 (2018.01)
G06F 9/445 (2018.01)
(52) U.S. Cl.
CPC .................. G06F 9/44505 (2013.01)
(58) Field of Classification Search
CPC ..... G06F 1/32; G06F 1/12; G06F 1/26; G06F 1/28; G06F 9/44
See application file for complete search history.

(56) References Cited

U.S. PATENT DOCUMENTS

| 6,671,802 | B1 | 12/2003 | Ot |
| 7,117,348 | B2 | 10/2006 | Holmberg |
| 7,373,498 | B2* | 5/2008 | Bolay ............... G06F 9/44505 713/1 |
| 9,448,808 | B2* | 9/2016 | Maity ............... G06F 9/4406 |

(Continued)

FOREIGN PATENT DOCUMENTS

| CN | 102455919 A | 5/2012 |
| CN | 104991782 A | 10/2015 |

(Continued)

OTHER PUBLICATIONS

Compaq Computer Corporation et al: "BIOS Boot Specification Version 1.01", Jan. 11, 1996 (Jan. 11, 1996), XP055724452.

(Continued)

Primary Examiner — Keshab R Pandey
(74) Attorney, Agent, or Firm — Tong, Rea, Bentley & Kim LLC

(57) ABSTRACT

In example implementations, methods to optimize a BIOS of a computer and an apparatus to perform the same is provided. The method includes detecting a change to the computer. A current BIOS configuration is compared to an optimized BIOS setting associated with the change. A setting of the current BIOS configuration is configured to match a corresponding setting of the optimized BIOS configuration. The computer is then operated with the optimized BIOS configuration associated with the change.

9 Claims, 4 Drawing Sheets

(56) References Cited

U.S. PATENT DOCUMENTS

| | | | |
|---|---|---|---|
| 10,262,309 B1* | 4/2019 | Chan | G06Q 20/123 |
| 2004/0268109 A1 | 12/2004 | Rothman et al. | |
| 2005/0138449 A1* | 6/2005 | Katoh | G06F 1/3203 |
| | | | 713/320 |
| 2007/0234031 A1* | 10/2007 | Garney | G06F 9/4401 |
| | | | 713/2 |
| 2008/0154987 A1* | 6/2008 | Kottomtharayil | G06F 11/1448 |
| 2009/0292910 A1* | 11/2009 | Yang | G06F 9/44505 |
| | | | 713/2 |
| 2011/0225274 A1* | 9/2011 | Dvorkin | G06F 9/44505 |
| | | | 709/222 |
| 2012/0096253 A1 | 4/2012 | Lu | |
| 2014/0082346 A1 | 3/2014 | Tao et al. | |

FOREIGN PATENT DOCUMENTS

| | | |
|---|---|---|
| CN | 105335167 A | 2/2016 |
| WO | 2011071493 A1 | 6/2011 |

OTHER PUBLICATIONS

"BIOS Optimizations for Xeon E5 v4 & E7 v4 Based Systems", Fujitsu Server Primergy, Jul. 20, 2016, 21 Pages.
Posey, "Tweaking BIOS Settings to Improve System Performance", Tweaking Bios Settings to Improve System Performance, Jul. 4, 2011, 6 Pages.

* cited by examiner

COMPUTERS WITH BIOS OPTIMIZATION

BACKGROUND

Computers are built with a Basic Input/Output System (BIOS). The BIOS is a type of firmware used to perform hardware initialization during a boot up process of the computer. The BIOS also provides runtime services for operating systems, programs and hardware. The BIOS may be the first software that is executed when the computer is powered on.

The BIOS can perform a variety of different functions for the computer. For example, the BIOS may initialize and test various computer hardware components and load a boot loader or an operating system from a mass memory device of the computer. The BIOS can also provide an abstraction layer for the hardware.

DETAILED DESCRIPTION

The present disclosure relates to a computer that is modified to perform automatic BIOS optimization and methods for performing the same. As discussed above, the BIOS can perform a variety of different functions for the computer. However, the BIOS can be customized for a particular operating system (OS). Certain settings of the BIOS can have different settings for different operating systems.

Many times a user may not be familiar with the BIOS menus and the different settings of the BIOS. Incorrectly set settings of the BIOS can cause the computer, or various hardware devices installed on the computer, to operate incorrectly. Many service calls for computer manufacturers may be related to addressing BIOS issues due to incorrectly set BIOS configurations, incompatible BIOS configurations when customers change the OS on the computer, or customers who do not know how to set the BIOS properly.

Examples of the present disclosure provide automatic BIOS optimization operations on a computer. As a result, the BIOS optimization operations of the computer can detect an OS change or a hardware change and automatically optimize a configuration of the BIOS for the OS change or the hardware change that is detected. Thus, the present disclosure provides a better user experience for customers and reduces costs associated with service calls from customers due to BIOS configuration issues.

Figure 1:
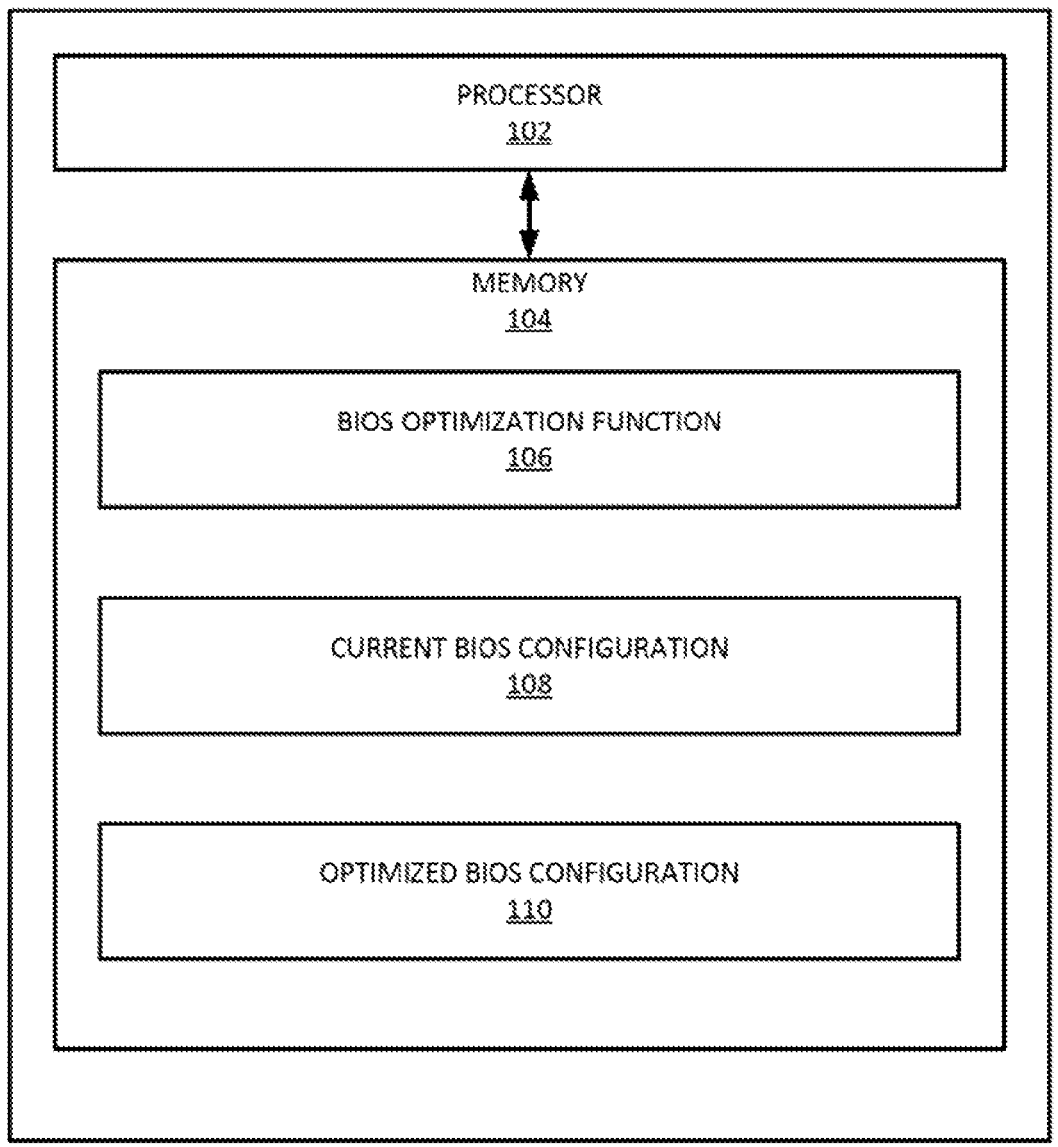
FIG. 1 is a block diagram of an example computer modified with a BIOS optimization operation of the present disclosure.

FIG. 1 illustrates a block diagram of a computer 100 of the present disclosure. The computer 100 may be a computing device such as a desktop computer, a laptop computer, and the like. The computer 100 may include a processor 102 and a memory 104. The memory 104 may include a BIOS optimization function 106, a current BIOS configuration 108, and an optimized BIOS configuration 110. The processor 102 may be in communication with the memory 104 and execute instructions associated with the BIOS optimization function 106 to perform the operations described herein.

In one example, the BIOS optimization function 106 may detect a change to the computer 100. For example, the change may be a change to the operating system (OS) of the computer 100 or installation of new hardware. In one example, when the OS is changed, the current BIOS configurations 108 may be not optimal for the new OS that is installed on the computer 100. For example, the new OS may have features that were not used in the previous OS. Thus, certain features of the new OS may not be enabled in the current BIOS configurations 108. Examples of features may be a fast boot BIOS feature, a modern standby BIOS feature, a secure boot BIOS feature, and the like that are supported by Windows® 10, but not Windows® 7.

In another example, when new hardware is installed, the BIOS optimization function 106 may check the status of a driver associated with the new hardware that is installed. The BIOS optimization function 106 may configure a setting of the current BIOS configuration 108 to match a setting of the optimized BIOS configuration that is associated with the driver of the new hardware. For example, a larger battery may be installed on a laptop computer and the turbo boost BIOS feature may be disabled because of the battery capability of the previous battery. However, with the larger battery, the turbo boost BIOS feature may be enabled.

However, many users may not know how to make the changes to the BIOS configurations. The menus in a BIOS configuration interface may be intimidating for an average user. The BIOS configurations may affect how the computer 100, and associated peripherals of the computer 100, operate. Some BIOS interfaces may have help menus, but the help menus may not provide information to the user on what the optimized settings are for a particular BIOS configuration associated with changes. Thus, the user may be afraid that incorrectly changing a setting in the BIOS configurations may negatively impact the operation and performance of the computer 100.

In one implementation, when the change to the computer 100 is detected, the BIOS optimization function 106 may compare the current BIOS configuration 108 to the optimized BIOS configuration 110. The BIOS optimization function 106 may ensure that the settings of the BIOS are optimized for the new OS, or the new hardware, that is installed on the computer 100. For example, the BIOS optimization function 106 may change settings in the current BIOS configuration 108 to match the corresponding settings in the optimized BIOS configuration 110.

In one example, the optimized BIOS configuration 110 may include a plurality of different optimized BIOS configurations 110 for different changes. For example, a first optimized BIOS configuration 110 may be for a first operating system, a second optimized BIOS configuration 110 may be for a second operating system, a third optimized BIOS configuration 110 may be for a first hardware, a fourth optimized BIOS configuration 110 may be for a second hardware, and so forth. Thus, based on the change that is detected, the BIOS optimization function 106 may use the appropriate optimized BIOS configuration 110 that corresponds to the change.

In one example, the BIOS optimization function 106 may generate a notification message to notify the user that changes have been detected and that the BIOS is not optimized. The notification message may include a list of BIOS configurations that are not optimized and suggested settings to optimize the BIOS for the changes that are detected.

Figure 2:
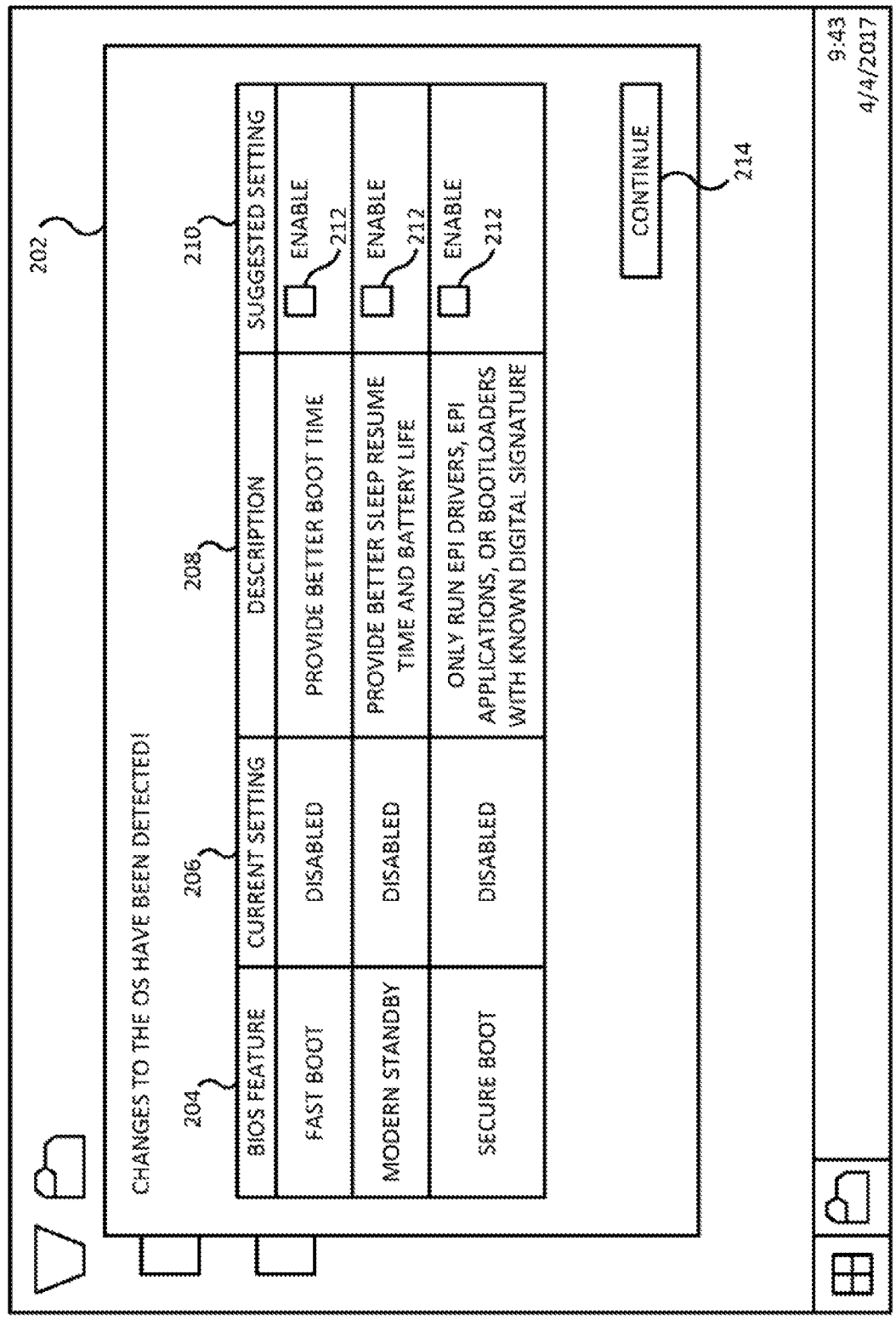
FIG. 2 is a block diagram of an example screenshot of the present disclosure.

FIG. 2 illustrates an example screen shot 200 of an example notification message 202. The notification message may include BIOS features 204, a current setting 206 for each one of the BIOS features 204, a description 208 of each one of the BIOS features 204, and a suggested setting 210 for each one of the BIOS features 204. In one example, the suggested setting 210 may include check boxes 212 to allow a user to select, which one of the suggested BIOS configuration changes he or she would like to implement.

In one example, the suggested setting 210 for each one of the BIOS features 204 may be identified by the BIOS optimization function 106. For example, the BIOS optimization function 106 may compare the current BIOS configuration 108 to the optimized BIOS configuration 110, as described above, to identify the settings that do match. The settings that do not match may be identified as not being optimized.

In one example, all of the check boxes 212 may be selected as a default setting. In other words, it may be assumed that a user would like to make all of the changes in the suggested setting 210 to optimize the BIOS of the computer 100.

In one implementation, the user may select a continue button 214 after the user has selected the appropriated checkboxes 212 for the suggested setting 210 of each one of the BIOS features 204. In response, the BIOS optimization function 106 may change the corresponding settings in the current BIOS configuration 108 automatically. The BIOS optimization function 106 may generate a signal to the processor 102 indicating that the changes have been completed causing the processor 102 to reboot, or restart, the computer 100 to implement the changes. As a result, the current BIOS configuration 108 may match the optimized BIOS configuration 110 for the change that was detected.

Figure 3:
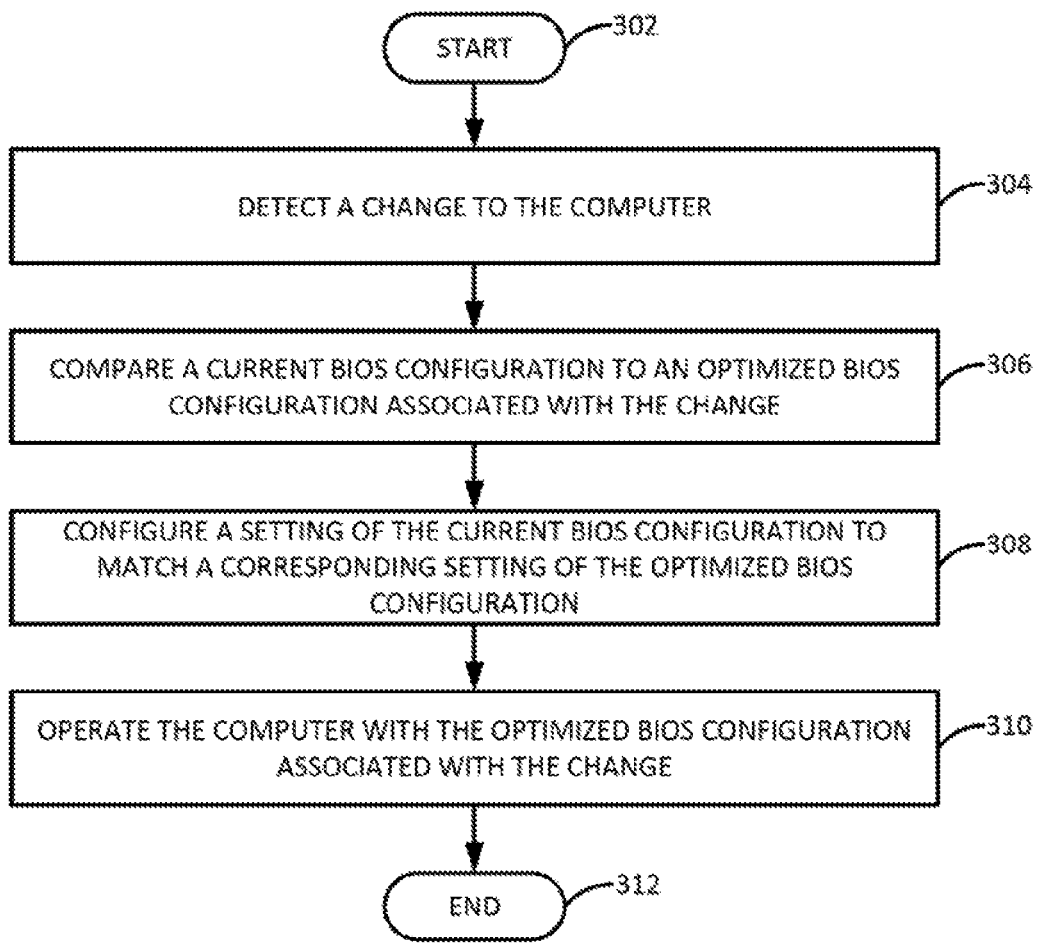
FIG. 3 is a block diagram of an example method for optimizing a BIOS of a computer of the present disclosure.

FIG. 3 illustrates a flow diagram of an example method 300 for optimizing a BIOS of a computer. In one example, the method 300 may be performed by the computer 100 or an apparatus 400 described below and illustrated in FIG. 4.

At block 302, the method 300 begins. At block 304, the method 300 detects a change to the computer. For example, the change may be an operating system change, a hardware change, and the like.

At block 306, the method 300 compares a current BIOS configuration to an optimized BIOS configuration associated with the change. In one example, an optimized BIOS configuration may be selected from a plurality of different optimized BIOS configurations associated with different changes. For example, an OS change may have a different optimized BIOS configuration than a hardware change.

The comparison of the current BIOS configuration to the optimized BIOS configuration may identify settings that are not optimized. In other words, the comparison may identify corresponding settings between the current BIOS configuration and the BIOS configuration that do not match.

At block 308, the method 300 configures a setting of the current BIOS configuration to match a corresponding setting of the optimized BIOS configuration. In one example, the settings that are changed, or configured, may be based on selections made by a user in a notification message that is displayed to the user in a graphical user interface (GUI). The notification message may indicate that a change was detected and include which settings are identified as not being optimized.

The notification message may include check boxes to allow the user to select which settings he or she would like to change or configure. In one example, a default setting may be to have all check boxes selected. For example, it may be assumed that the user would want all of the settings configured to optimize the BIOS configuration.

In one example, when the change is a hardware change, the method 300 may obtain a status of the driver associated with the change. The setting of the current BIOS configuration may be configured to match a setting of the optimized BIOS configuration that is associated with the driver.

At block 310, the method 300 operates the computer with the optimized BIOS configuration associated with the change. For example, after the settings to change are confirmed by a user, the settings of the current BIOS configuration may be automatically changed to match the corresponding settings of the optimized BIOS configuration. The computer may be restarted, or rebooted, to implement the changes and the computer may operate with the optimized BIOS configuration. In other words, after the changes, the current BIOS configuration may be the same as the optimized BIOS configuration. At block 312, the method 300 ends.

Figure 4:
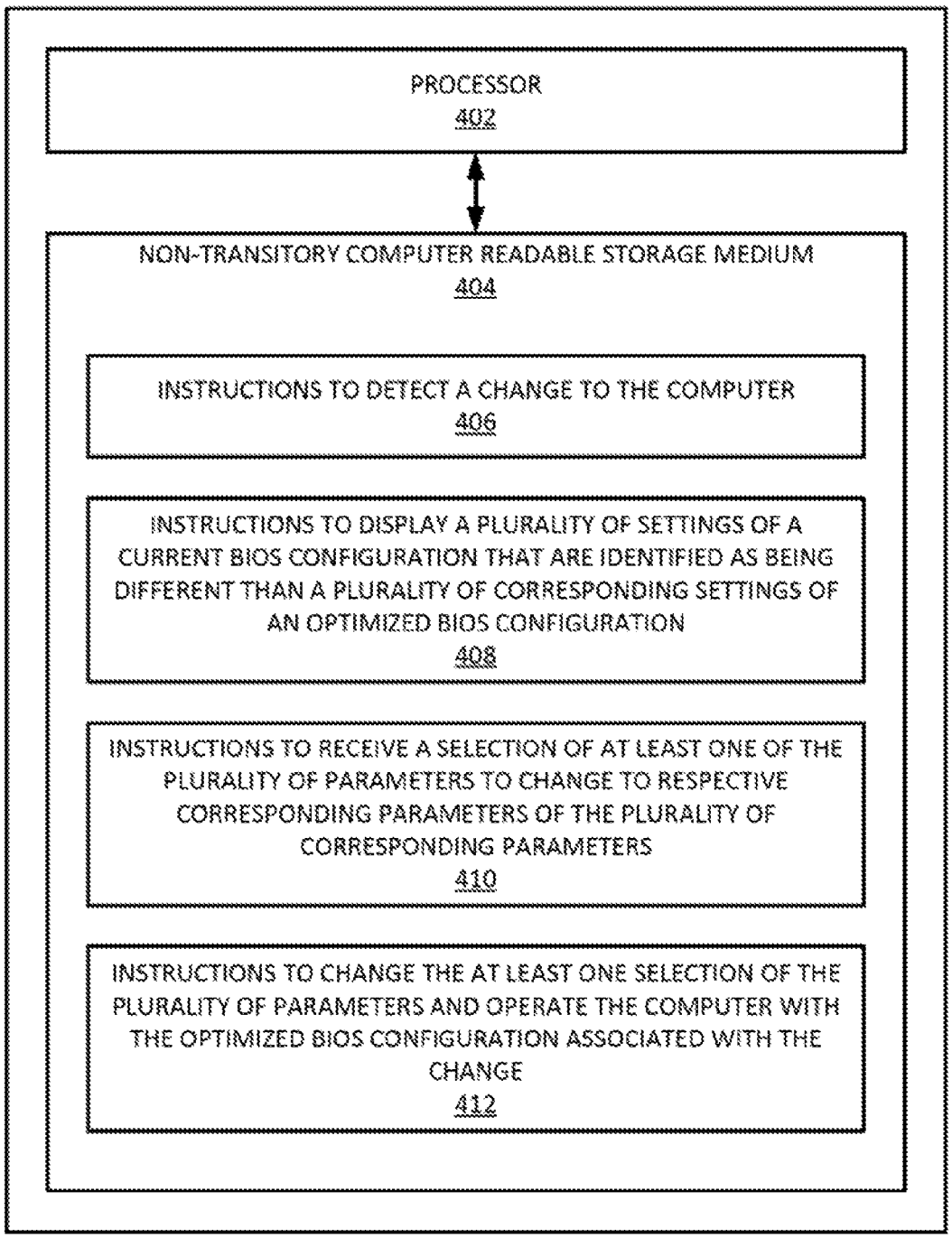
FIG. 4 is an example non-transitory computer readable medium storing instructions executed by a processor of the present disclosure.

FIG. 4 illustrates an example of an apparatus 400. In one example, the apparatus 400 may be the mobile endpoint device 102. In one example, the apparatus 400 may include a processor 402 and a non-transitory computer readable storage medium 404. The non-transitory computer readable storage medium 404 may include instructions 406, 408, 410 and 412 that when executed by the processor 402, cause the processor 402 to perform various functions.

In one example, the instructions 406 may include instructions to detect a change to the computer. The instructions 408 may include instructions to display a plurality of settings of a current BIOS configuration that are identified as being different than a plurality of corresponding settings of an optimized BIOS configuration. The instructions 410 may include instructions to receive a selection of at least one of the plurality of settings to change to respective corresponding settings of the plurality of corresponding settings. The instructions 412 may include instructions to change the at least one selection of the plurality of settings and operate the computer with the optimized BIOS configuration associated with the change.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A method, comprising:
   detecting, by a processor of a computer, a change to the computer, wherein the change to the computer comprises an operating system change or a new hardware installation;
   comparing, by the processor, a current BIOS configuration to a plurality of different optimized BIOS configurations that are stored for different operating system changes or new hardware installations to identify an optimized BIOS configuration associated with the change after the change to the computer is detected;
   configuring, by the processor, a setting of the current BIOS configuration to match a corresponding setting of the optimized BIOS configuration; and
   operating, by the processor, the computer with the optimized BIOS configuration associated with the change.

2. The method of claim 1, comprising:
obtaining, by the processor, a status of a driver associated with the change; and
configuring, by the processor, the setting of the current BIOS configuration to match a setting of the optimized BIOS configuration that is associated with driver.

3. The method of claim 1, comprising:
displaying, by the processor, a notification message to indicate that the current BIOS is not optimized.

4. The method of claim 3, wherein the notification message displays the setting and a suggested configuration for the optimized BIOS configuration.

5. The method of claim 4, wherein the setting comprises a plurality of settings and notification message includes check boxes to allows selection of at least one of the plurality of settings.

6. A non-transitory computer readable storage medium encoded with instructions executable by a processor of a computer, the non-transitory computer-readable storage medium comprising:
instructions to detect a change to the computer, wherein the change to the computer comprises an operating system change or a new hardware installation;
instructions to display a plurality of settings of a current BIOS configuration that are identified as being different than a plurality of corresponding settings of an optimized BIOS configuration based on a comparison of the current BIOS configuration to a plurality of different optimized BIOS configurations that are stored for different operating system changes or new hardware installations after the change to the computer is detected;
instructions to receive a selection of at least one of the plurality of settings to change to respective corresponding settings of the plurality of corresponding settings; and
instructions to change the at least one selection of the plurality of settings and operate the computer with the optimized BIOS configuration associated with the change.

7. The non-transitory computer readable storage medium of claim 6, comprising:
instructions to obtain a status of a driver associated with the change; and
instructions to configure the setting of the current BIOS configuration to match a setting of the optimized BIOS configuration that is associated with driver.

8. The non-transitory computer readable storage medium of claim 6, wherein the optimized BIOS configuration is selected from a plurality of different optimized BIOS configurations that are stored for different changes.

9. A computer, comprising:
a processor;
a memory; and
a BIOS optimization function stored in the memory and executed by the processor, wherein the BIOS optimization function is to:
detect a change to the computer, wherein the change comprises an operating system change or a new hardware installation,
compare a current BIOS configuration to a plurality of different optimized BIOS configurations that are stored for different operating system changes or new hardware installations to identify an optimized BIOS configuration associated with the change, and
change a setting of the current BIOS configuration to match a corresponding setting of an optimized BIOS configuration that is identified from the plurality of different optimized BIOS configurations in response to the change that is detected.

\* \* \* \* \*